March 6, 1951 F. J. KENNEDY 2,544,233
NONMETALLIC SHEATHED MULTICONDUCTOR CABLE
Filed Aug. 13, 1949 3 Sheets-Sheet 1
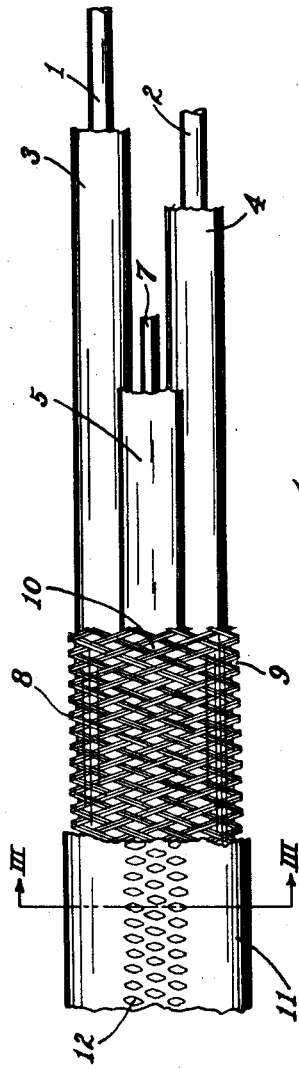
Fig. I
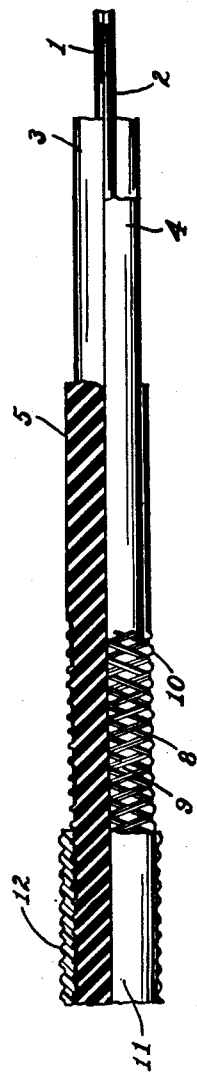
Fig. II
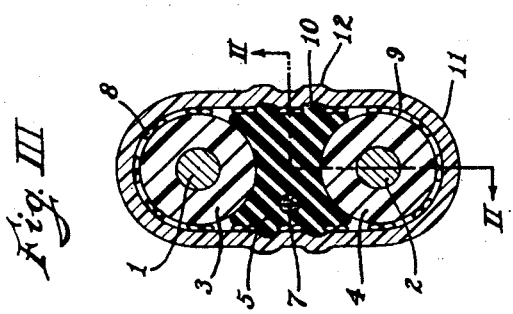
Fig. III
INVENTOR
Frank J. Kennedy
By William B. Wharton
his attorney March 6, 1951  F. J. KENNEDY  2,544,233
NONMETALLIC SHEATHED MULTICONDUCTOR CABLE
Filed Aug. 13, 1949  3 Sheets-Sheet 2
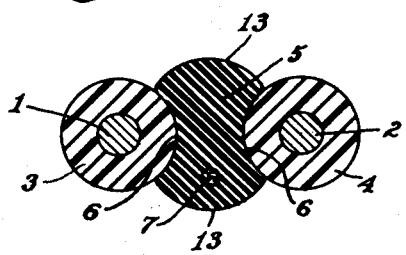
Fig. IV
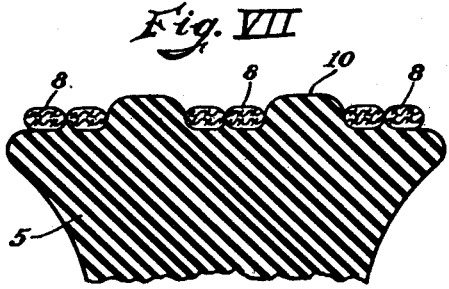
Fig. VII
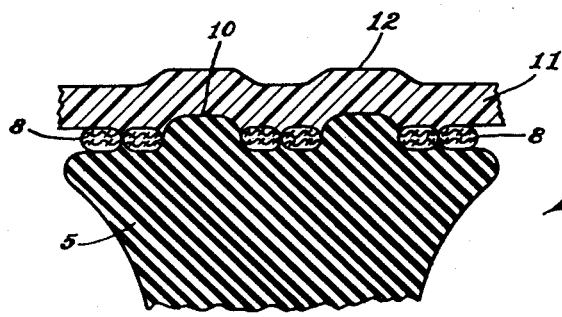
Fig. VIII
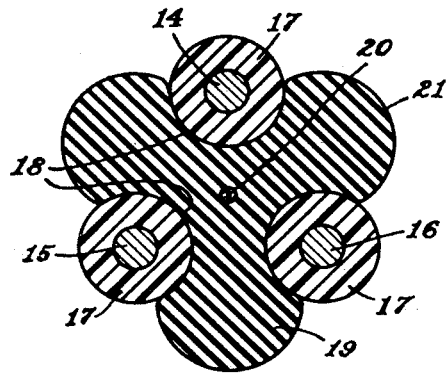
Fig. V
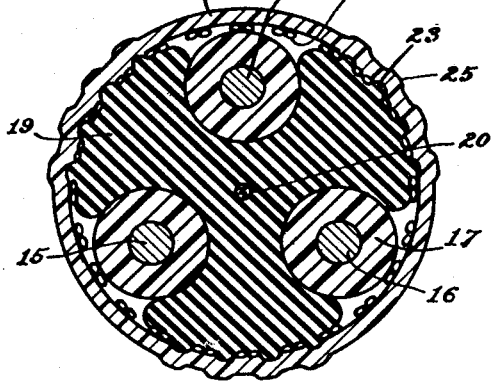
Fig. VI
INVENTOR
Frank J. Kennedy
by William B. Wharton
his attorney March 6, 1951 F. J. KENNEDY 2,544,233
NONMETALLIC SHEATHED MULTICONDUCTOR CABLE
Filed Aug. 13, 1949 3 Sheets-Sheet 3
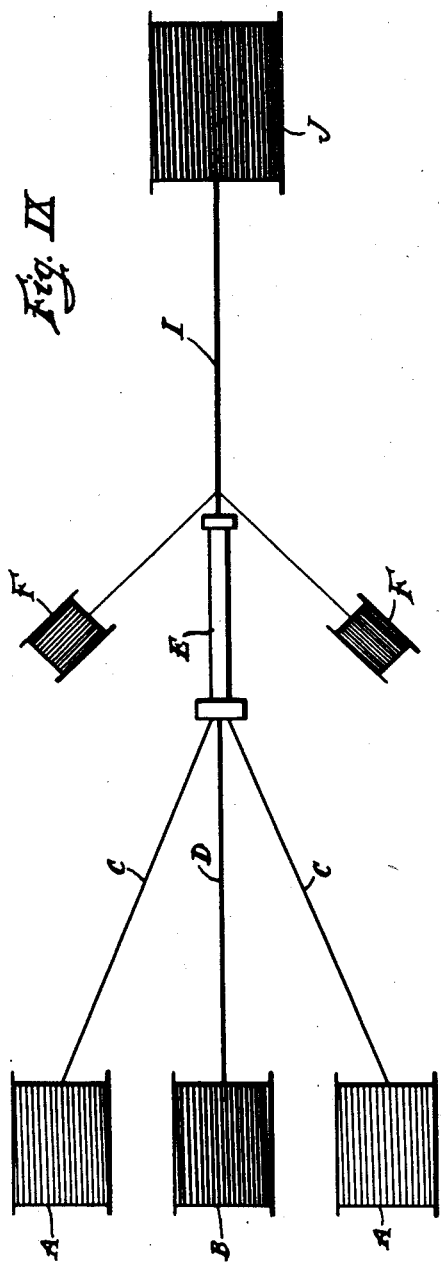
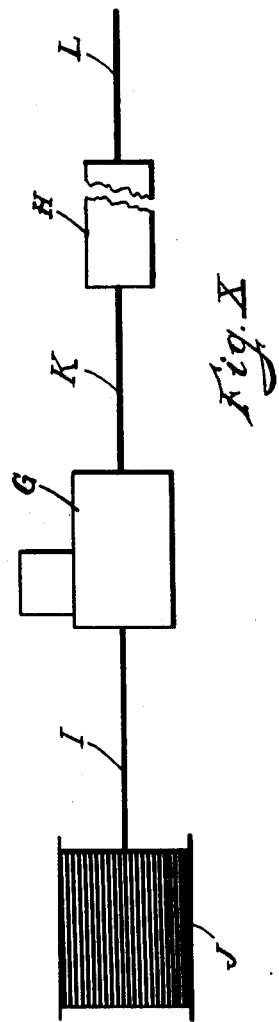
INVENTOR
Frank J. Kennedy
by William B. Wharton
his attorney Patented Mar. 6, 1951

2,544,233

UNITED STATES PATENT OFFICE 2,544,233

NONMETALLIC SHEATHED MULTICON-
DUCTOR CABLE

Frank J. Kennedy, Mount Lebanon, Pa., assignor to National Electric Products Corporation, Pittsburgh, Pa., a corporation of Delaware Application August 13, 1949, Serial No. 110,107

2 Claims. (Cl. 174—116)

1

This invention relates to electrical nonmetallic sheathed cable.

In non-metallic sheathed cable there are various considerations to be satisfied, some of which considerations are primarily inconsistent. Thus it is important that the cable be of enduringly water-proof structure; that it be resistant to mechanical injury; that it possess slow ageing properties; that it provide adequate insulation; that the metal of the conductor wires be adequately spaced from each other within the structure of the cable; that it be so organized structurally as to provide a good grip by connectors on the overall structure of the cable rather than on bared conductor wires at junction boxes, switch boxes and outlet boxes all usually grouped generically under the term "outlet" boxes and at other points of connection; that it be susceptible of easy and clean stripping of the conductor wires at the points of attachment and connection; that it should coil and fish readily; that it should not be unduly bulky or expensive due to a multiplicity of constructive layers in its composition; that the outer structure of the cable assembly should not tend to slide on the conductors it embraces when the cable is tightened against a point of engagement or pulled past an obstruction; and also that the structure of the cable be interiorly so integrated that it is highly resistant to internal disruption as well as to destruction by the application of external disruptive forces.

It is the object of this invention to provide a non-metallic sheathed cable fulfilling all of the requirements noted above and to provide such cable while utilizing a minimum of material and at reasonable cost.

As simply described, the non-metallic sheathed cable of this invention comprises two or more conductor wires sheathed in suitable high polymer elastomeric material which may be either a natural rubber or synthetic rubber such as buna rubber or one of the haloprenes and typically chloroprene; a filler and spacer strip which also is composed of natural rubber composition or a synthetic rubber such as chloroprene, which is capable of substantial softening and flow before and during the initial stages of vulcanization and which is formed to receive and partially to embrace and to hold the insulated conductors in recesses of its structure in mutually spaced relation; a stranded fibrous structure having spaced strands surrounding the inner assembly of conductors and filler strip with substance of the filler strip projectant through the spaces of the said stranded fibrous

2 cover; and an outer jacket also of one of the high polymer elastomeric materials adherent to the substance of the filler strip at the points of projection of the said substance between interstices of the stranded fibrous cover.

I manufacture the cable described briefly above by bringing the insulated conductor wires, the insulation of which consists of high polymer elastomeric material which desirably is already vulcanized, into recesses in a filler strip of unvulcanized high polymer elastomeric material which may, for example, be an inexpensive grade of natural rubber strengthened by reinforcing cord, or a better grade of rubber, chloroprene or the like. Around this initial assembly of insulated conductors and the filler and spacer strip in which they are lodged, I then apply a braid or simple serving of stranded fibrous material, such as spun glass, cotton, nylon, or other suitable fibrous material of known sort. This stranded covering I apply around the conductors and unvulcanized filler and spacer strip in a manner to leave interstices between strands through which the relatively soft substance of unvulcanized filler strip is squeezed and projects. This initial assembly is then passed through an extruding die in which it serves as a core around which the outer jacket of unvulcanized high polymer elastomeric material, such as chloroprene of a good grade of natural or other synthetic rubber, is applied. This complete unvulcanized assembly is then passed through a vulcanizer in which both the outer jacket and the filler strip are subjected to vulcanization. The simultaneous vulcanization of these two elements produces permanent adhesion between the outer jacket and those portions of the filler strip which project through the stranded covering into contact with the outer jacket.

In the accompanying drawings, illustrative of the embodiment of my invention:

Fig. I is an elevational view of a two-conductor cable in accordance with my invention broken away regionally on two division lines to expose the several elements included in the cable structure.

Fig. II is a cross-sectional view showing the complete assembly broken away regionally as in Fig. I and taken in the plane of the section line II—II of Fig. III.

Fig. III is a longitudinal sectional view taken in the two mutually perpendicular planes indicated by the irregular section line III—III of Fig. I.

Fig. IV is a cross-sectional view through an initial assembly made at an early stage in the manufacture of the two-conductor cable of Figs. I to III inclusive.

Fig. V is a cross-sectional view corresponding to Fig. IV taken through the initial assembly in the manufacture of a three-wire cable made in accordance with my invention.

Fig. VI is a cross-sectional view corresponding to Fig. III taken through a complete three-conductor cable assembly in accordance with my invention.

All the above views are on a scale substantially enlarged with respect to the size of the cable as usually made.

Fig. VII is a fragmentary cross-sectional view on a greatly enlarged scale, showing the condition at the outer surface of the filler and spacer block of the cable assembly after application of a fibrous covering around the initial assembly; the contour shown in this view being that of the two-conductor cable shown in Figs. I to IV inclusive, but the effect illustrated being equally applicable to the three-conductor cable of Figs. V and VI.

Fig. VIII is a view similar to Fig. VII in its presentation, but showing the outer structure of the cable after the outer jacket of high polymer elastomeric material has been applied to become part of the cable assembly.

Figs. IX and X are diagrammatic views illustrating the several stages in a method of manufacturing the cable.

Referring to the drawings and initially Figs. I, II and III showing a complete cable assembly, the cable therein shown is a two-conductor cable of an approximate elliptical cross-sectional contour. This complete cable assembly comprises two-conductor wires 1 and 2, encased in jackets of vulcanized elastomeric material which in practice under my invention usually is vulcanized chloroprene. Both the conductors 1 and 2 in their respective jackets 3 and 4 are held in accurately spaced relation with each other by a filler strip 5 in sockets of which the jackets of the conductors lie. As indicated above filler strip 5 may be made of any suitable elastomeric material, such as a natural rubber composition, a haloprene, or one of the other synthetic rubbers, such as the copolymers of styrene and butadiene, or the copolymers of butadiene and acrylic nitrile. In its intended function, however, the filler and spacer strip 5 may for purposes of manufacturing economy be made of an inexpensive grade of reclaimed rubber provided with a reinforcing strand 7 of spun glass, nylon, cotton, or the like, having adequate tensile strength to add to the tensile strength of the filler and spacer strip. Even though the filler and spacer strip be composed of a good grade of natural or synthetic rubber, a reinforcing cord desirably is included to strengthen the strip during the manufacturing of the cable.

Around this inner assembly of the conductors comprising conductor wires and their jackets and the filler and spacer strip there is a braid 8 of suitable stranded fibrous material, such as spun glass, nylon, cotton, or the like, the turns of which are so spaced as to leave interstices 9 between them. Through these interstices 9 there extend projections 10 of the substance of filler and spacer strip 5 and these projections are in vulcanized integration with an outer jacket 11 which desirably is formed of high polymer elastomeric material of high grade, such as a good grade of natural rubber, chloroprene, or one of the other synthetic rubbers, chloroprene being preferred as the substance of which this outer jacket is composed. It will be observed that the projections 10 of the filler and spacer strip produce a plurality of knobs or bosses 12 on the outer surface of outer jacket 11. These bosses or knobs 12 being of relatively slight outward extent and being slightly tapered or rounded in their cross-sectional contour, present an advantage rather than a disadvantage in use of the cable. This is for the reason that they facilitate a good grip on the cable without impairing the sliding motion of the cable as in fishing it through conduits or in other operations performed during installation.

It is suitable to make the stranded covering over the inner assembly of jacketed conductor wires and their associated filler or spacer strip as a simple serving consisting of spaced turns of strands composed of spun glass, cotton, nylon, or the like, rather than a braid. In such case the regions of the filler strip projectant between turns of the serving and which are in vulcanized integration with the outer jacket, extend uninterruptedly across the faces of the filler strip. In conformity with the form of those projectant portions of the filler strip the bosses on the outer surface of the jacket extend uninterruptedly across that region of the jacket surface within which the projectant portions of the filler strip lie.

It will be noted that the foregoing gives an assembly which is not only compact but which is definitely integrated. That is, the insulated conductors are confined within the stranded covering and the outer jacket and against the filler and spacer strip. The filler and spacer strip by its projections into contact with the outer jacket is adherent to or integrated with that jacket, and by its projection through the interstices of the braid also integrates the braid in the jacket assembly. The solid structure of filler strip and jacket gives a firm backing against which connectors bear in clamping cable at outlet boxes and the like. Also by the vulcanized integration between the filler and spacer strip and the jacket involving the stranded covering between them, these elements are anchored to each other against any normally encountered accidental disruptive forces, so that the jacket of the assembly does not tend to slide and wrinkle under forces applied longitudinally of the cable as in pulling against the engagement of an outlet box or against an obstruction encountered as in fishing the cable. The cable also can be coiled on a relatively short radius without danger of disruption and is so compact in structure as to occupy a minimum of space when coiled or installed.

In manufacturing the cable I first make an assembly as in Fig. IV of the drawings, with the two conductors consisting of the wires 1 and 2 and their insulating jackets 3 and 4 nested in the sockets 6 of filler and spacer strip 5. In this assembly the substance of the filler and spacer strip 5 which lies between the conductors extends outwardly in both directions such distance that its outer surfaces 13 lie outwardly beyond the peripheries of the conductors. When, therefore, the stranded covering 8 is applied tightly over the assembly with interstices 9 between strands, the substance of the filler and spacer strip which is unvulcanized projects through those interstices in preparation for bonding with the outer jacket of the cable assembly. This condition at the exposed surfaces of spacer and filler strip 5 is shown on greatly enlarged scale in Fig. VII of the drawings, with portions 10 of the filler strip substance projectant outwardly beyond the strands of covering 8 and with the substance of filler and spacer strip 5 still unvulcanized.

In this condition the partial assembly is passed through an extruding die in which it serves as a core around which is extruded the outer jacket 11 of unvulcanized high polymer elastomeric material, such as unvulcanized chloroprene. This assembly is shown on greatly enlarged scale in Fig. VIII of the drawings in which it will be seen that the portions 10 of the filler strip which are projectant through the interstices of the stranded covering lie in direct contact with the inner surface of jacket 11. The assembly is then subjected to vulcanization which serves to integrate jacket 11 with the projectant portions 10 of the filler strip, both the jacket 10 and the filler strip 5 simultaneously undergoing vulcanization in the process. Desirably, jackets 3 and 4 of the individual conductors are prevulcanized before assembly so that when the cable is stripped at an outlet box to make electrical connection at terminals the two conductors are readily pulled away from the filler strip for attachment each at its own terminal. This avoids distortion of the conductor jackets during vulcanization and even the remote possibility that the jackets of the conductors, by softening during vulcanization, might so bond with the substance of the filler and spacer strip that the jacket of a conductor would be torn during separation for terminal attachment.

As illustrated in Figs. V and VI of the drawings, the same principles that apply to the construction of the two-conductor cable shown in Figs. I to IV apply also to cables comprising three or more conductors. Specifically, Figs. V and VI show respectively in cross section and on enlarged scale a three-conductor cable in accordance with my invention. In that cable conductor wires 14, 15 and 16 having thereon vulcanized sheaths of high polymer elastomeric material 17 for each individual conductor are nested in sockets 18 of a filler and spacer block 19, which also is of high polymer elastomeric material and which for purposes of economy may be an inexpensive grade of natural rubber composition. On the assumption that such considerations of economy are followed, a reinforcing cord 20 similar to the reinforcing cord 7 of the two-conductor cable is shown.

As initially described with reference to the two-conductor cable, filler and spacer block 19 is unvulcanized as included in the initial assembly of Fig. V, and is so shaped that the outer surfaces 21 of its lobes lying between the conductors extends outwardly beyond the peripheries of the conductor jackets. Similarly as stranded covering 22 (shown in Fig. VI) is applied, the substance of the filler and spacer strip which extends outwardly beyond the peripheries of the conductor jackets is squeezed and forced outwardly through the interstices between spaced strands of the stranded covering to provide projectant portions 23. In this connection the greatly enlarged view of Fig. VII applies in principle to the analogous stage in the manufacture of the three-conductor cable. At this stage of manufacture the assembly with its spaced turns of stranded covering and with the projectant substance of the filler and spacer strip therebetween, serves as the core around which there is extruded outer jacket 24 of high polymer elastomeric material which, as previously noted, is most desirably chloroprene. The entire assembly is then vulcanized and in the vulcanization the projectant reaches 23 of the filler and spacer strip acquire bonded integration with the outer jacket, and series of slightly projectant knobs or bosses 25 are formed on the outer surface of the jacket. The greatly enlarged illustration of Fig. VIII serves also to illustrate this final structure of a cable comprising three or more conductors, as well as the structure of a two-conductor cable.

Referring to the diagrammatic illustration of Figs. IX and X it will be seen that the method of manufacture is readily and economically performed. In Fig. IX of the drawings A—A represent reels from which the insulated conductors of the assembly pass, and B represents a reel from which the filler and spacer strip is unwound. The two conductors C—C, the drawings being illustrative of the manufacture of a two-conductor cable, pass through and are brought into desired relation in assembler E with the unvulcanized filler and spacer strip D between them and extended beyond their peripheries. From assembler E the initial assembly passes through braiding or serving apparatus F in which the stranded covering is applied with spaced turns but with a tight braid or serving. From braiding or serving apparatus E the assembly I of conductors, filler strip and stranded covering is collected on a reel J.

As illustrated in Fig. X, the assembly I passes through an extruding die G in which the outer jacket of unvulcanized elastomeric material is applied to and compacted on that assembly which serves as a core for the application. From extruding die G the complete unvulcanized assembly K then passes through a vulcanizer H in which the outer jacket and the filler and spacer strip are vulcanized, being integrated by the vulcanization in the manner which has been described above to provide the completed cable L.

It will be noted that the foregoing diagrammatic illustration and brief description of apparatus and method steps employed in the manufacture of the cable relates more particularly to the manufacture of a two-conductor cable. In making a three-conductor cable the same steps and apparatus are used with necessary modification in size and arrangement, save that the assembly apparatus is provided with means by which the assembly of filler strip and conductors is twisted after insertion of the conductors in the filler strip and before application of the stranded covering. Such twisting gives a multi-conductor cable in which the conductors have a helical lay.

It is apparent from the foregoing that a cable of solid substance and which is securely integrated in its structure is thus provided. That cable being composed wholly of natural or synthetic rubber with the exception of the conductor wires and the stranded covering or inner jacket, is structurally firm and susceptible to firm bodily engagement by mechanical connectors at outlet boxes and the like. Because of the direct bonded integration between the substance of the filler and spacer strip and the outer jacket, which integration also serves firmly to position the fabric covering with both those elements, there is no tendency for the outer elements of the cable structure to slide and wrinkle under exteriorly applied forces and no tendency for the conductors to shift from accurately spaced position in the cable. In making connection at outlet boxes the substance of a cable gripped bodily by a connector strips readily to expose conductor wires for electrical connection.

I claim as my invention:

1. In a non-metallic sheathed cable the combination of a plurality of conductor wires sheathed in vulcanized high polymer elastomeric material, a filler block of vulcanized high polymer elastomeric material positioning the said sheathed conductor wires in mutually spaced relation, the sheaths of said conductors and said filler block being mutually non-adherent, a stranded fibrous covering around the inner assembly of sheathed conductor wires and filler block having between strands thereof interstices through which the substance of the said filler block projects, and a jacket of high polymer elastomeric material surrounding said stranded fibrous covering and having a vulcanized bond with the said substance of the filler block projectant through the interstices of the said stranded covering.

2. In a non-metallic sheathed cable the combination of a plurality of conductor wires sheathed in vulcanized high polymer elastomeric material, a filler block of high polymer elastomeric material positioning the said sheathed conductor wires in mutually spaced relation, the sheaths of said conductors and said filler block being mutually non-adherent, a stranded fibrous covering around the inner assembly of sheathed conductor wires and filler block having between strands thereof interstices through which the substance of the said filler block projects, and a jacket of high polymer elastomeric material surrounding and adherent to the said stranded fibrous covering and adherent to the said substance of the filler block projectant through the interstices of the said stranded covering.

FRANK J. KENNEDY.

REFERENCES CITED

The following references are of record in the file of this patent:

UNITED STATES PATENTS

| Number | Name | Date |
|---|---|---|
| 1,698,704 | Middleton et al. | Jan. 8, 1929 |
| 1,977,209 | Sargent | Oct. 16, 1934 |
| 2,119,393 | Lewis et al. | May 31, 1938 |
| 2,294,919 | Lunsford | Sept. 18, 1942 |
| 2,455,773 | Johnson | Dec. 7, 1948 |

FOREIGN PATENTS

| Number | Country | Date |
|---|---|---|
| 437,525 | England | Oct. 31, 1935 |